United States Patent
Fevre et al.

(10) Patent No.: US 11,919,563 B2
(45) Date of Patent: Mar. 5, 2024

(54) STEERING COLUMN SLEEVE COMPRISING A SYSTEM FOR ADJUSTING A RELATIVE POSITION BETWEEN TWO TUBES

(71) Applicant: Robert Bosch Automotive Steering Vendome, Vendome (FR)

(72) Inventors: Laurent Fevre, Saint Sulpice (FR); Eddy Dupont, Cloyes sur le Loir (FR)

(73) Assignees: Robert Bosch Automotive Steering Vendome, Vendome (FR); Robert Bosch GmbH, Stuttgart (DE)

( * ) Notice: Subject to any disclaimer, the term of this patent is extended or adjusted under 35 U.S.C. 154(b) by 38 days.

(21) Appl. No.: 17/777,576

(22) PCT Filed: Nov. 20, 2020

(86) PCT No.: PCT/EP2020/082963
§ 371 (c)(1),
(2) Date: May 17, 2022

(87) PCT Pub. No.: WO2021/099606
PCT Pub. Date: May 27, 2021

(65) Prior Publication Data
US 2023/0018690 A1    Jan. 19, 2023

(30) Foreign Application Priority Data

Nov. 22, 2019 (FR) .................................... 1913141
Dec. 10, 2019 (FR) .................................... 1914105

(51) Int. Cl.
*B62D 1/181* (2006.01)
*B62D 1/185* (2006.01)
(Continued)

(52) U.S. Cl.
CPC ............. *B62D 1/181* (2013.01); *B62D 1/185* (2013.01); *F16C 19/163* (2013.01); *F16C 19/36* (2013.01); *F16C 2326/24* (2013.01)

(58) Field of Classification Search
CPC ..... B62D 1/181; B62D 1/185; F16C 2326/24; F16C 19/163; F16C 19/36
See application file for complete search history.

(56) References Cited

U.S. PATENT DOCUMENTS 4,602,520 A   7/1986  Nishikawa et al.
4,669,325 A   6/1987  Nishikawa et al.
(Continued)

FOREIGN PATENT DOCUMENTS

DE    102014104362 A1 * 10/2015 ............. B62D 1/181
EP    2 857 282 A1    4/2015

OTHER PUBLICATIONS

International Search Report corresponding to PCT Application No. PCT/EP2020/082963, dated Feb. 15, 2021 (French and English language document) (6 pages).

*Primary Examiner* — Laura Freedman
(74) *Attorney, Agent, or Firm* — Maginot, Moore & Beck LLP

(57) ABSTRACT

A sleeve of a steering column includes (i) an outer tube and an inner tube that are movable relative to each other, and (ii) an adjustment system. The adjustment system includes a screw for adjusting the axial position along an adjustment axis constrained to move in translation with a first of the two elements by at least two guide bearings for rotationally guiding the adjusting screw about the adjustment axis. At least one of the bearings supporting the adjusting screw is a guide bearing with axial force take-up for blocking the translational movement of the adjusting screw.

16 Claims, 3 Drawing Sheets

(51) Int. Cl.
*F16C 19/16* (2006.01)
*F16C 19/36* (2006.01)

(56) References Cited

U.S. PATENT DOCUMENTS

| | | | | |
|---|---|---|---|---|
| 4,716,780 | A | | 1/1988 | Nishikawa et al. |
| 5,036,720 | A | | 8/1991 | Shirasawa et al. |
| 5,178,411 | A | * | 1/1993 | Fevre ................... B62D 1/181 |
| | | | | 280/775 |
| 5,690,362 | A | * | 11/1997 | Peitsmeier ............ B62D 1/181 |
| | | | | 280/775 |
| 6,711,965 | B2 | * | 3/2004 | Tomaru ................. B62D 1/181 |
| | | | | 318/470 |
| 7,025,380 | B2 | * | 4/2006 | Arihara ................. B62D 1/181 |
| | | | | 280/775 |
| 7,444,900 | B2 | * | 11/2008 | Tomaru .............. F16C 11/0657 |
| | | | | 74/495 |
| 8,161,839 | B2 | | 4/2012 | Warashina |
| 8,991,861 | B1 | * | 3/2015 | Iwakawa ............... B62D 1/181 |
| | | | | 74/495 |
| 9,126,624 | B2 | * | 9/2015 | Iwakawa ............... B62D 1/181 |
| 9,254,861 | B2 | * | 2/2016 | Iwakawa ............... B62D 1/187 |
| 10,228,047 | B2 | * | 3/2019 | Nunez .................... F16H 25/20 |
| 10,421,475 | B2 | * | 9/2019 | Derocher ............. F16H 25/205 |
| 10,974,756 | B2 | * | 4/2021 | Cana ...................... B62D 1/181 |
| 11,702,124 | B2 | * | 7/2023 | Huber ................. F16C 33/588 |
| | | | | 74/493 |
| 2008/0047382 | A1 | * | 2/2008 | Tomaru .............. F16H 25/2009 |
| | | | | 74/493 |
| 2017/0015345 | A1 | * | 1/2017 | Galehr .................. B62D 1/181 |
| 2022/0410962 | A1 | * | 12/2022 | Fevre .................... B62D 1/185 |
| 2023/0043788 | A1 | * | 2/2023 | Ponikiewski .......... B62D 1/181 |

\* cited by examiner

STEERING COLUMN SLEEVE COMPRISING A SYSTEM FOR ADJUSTING A RELATIVE POSITION BETWEEN TWO TUBES

This application is a 35 U.S.C. § 371 National Stage Application of PCT/EP2020/082963, filed on Nov. 20, 2020, which claims the benefit of priority to (i) Serial No. FR 1913141, filed on Nov. 22, 2019 in France, and (ii) Serial No. FR 1914105, filed on Dec. 10, 2019 in France, the disclosures of which are incorporated herein by reference in their entirety.

The disclosure generally concerns the technical field of steering columns including a system for adjustment of an axial relative position between two elements moving in translation.

The disclosure relates more specifically to a sleeve of a steering column including a system for adjustment of a relative axial position between two elements consisting of an outer tube and an inner tube mobile in translation relative to one another to enable adjustment of the depth-wise position of a steering wheel of a vehicle, such as an automobile vehicle.

BACKGROUND

The steering wheels of automobile vehicles are very frequently adjustable in depth and in height thanks to an adjustment system operated by a user of the vehicle. This kind of adjustment system generally comprises an adjustment mechanism situated on a sleeve of a steering column of the automobile vehicle and may be manual or electric. In the case of an electric system an assembly consisting of a lead screw gear motor associated with a nut-and-screw system converts the rotational movement of an electric motor into a movement in translation, said electric motor then being sized to achieve the required adjustment speed given friction forces present in the sleeve of the steering column and more generally in the kinematic chain.

A depth-wise adjustment is generally produced by means of a telescopic system of two tubes: an outer tube and an inner tube configured to move in translation inside the outer tube, the electric motor or gear motor being conventionally fixed to the outer tube of the sleeve of the steering column, and supports an adjustment screw that drives a nut connected to the inner tube.

In the situation where high forces are exerted on the steering wheel of the vehicle in the direction of the axis of the vehicle, said axial forces are taken up by the adjustment screw and the gear motor, which transmits them to the structure of the vehicle via the structure of the column. This is particularly true in an accident situation, in which the forces are very high and can range for example up to 10 000 N.

This leads to over-sizing the connection of the gear motor with the steering column in order to resist much greater forces than the forces that are applied to it in a normal adjustment operation.

Moreover, this over-sizing of the connection of the gear motor with the structure of the steering column is dictated by the necessity of making this connection of the gear motor with the structure of the steering column rigid and therefore transmit the vibrations generated by the motor to the structure, which tends to increase the noise perceived by the driver and therefore their discomfort.

SUMMARY

The disclosure aims to remedy some or all of the disadvantages of the prior art by proposing in particular an adjustment system that is simple to use and relatively compact and the casing of the gear motor of which can be sized just right.

To this end there is proposed, in accordance with a first aspect of the disclosure, a sleeve of a steering column including two elements consisting of an outer tube and an inner tube mobile in translation relative to one another along a reference axis and an adjustment system comprising a screw for adjustment of the axial position extending along an adjustment axis parallel to the reference axis and constrained to move in translation with a first of the two elements by means of at least two guide bearings to guide the adjustment screw in rotation about the adjustment axis, the adjustment screw being inter-engaged with a nut fastened to the second of the two elements so that rotation of the screw about the adjustment axis drives movement of the nut in translation relative to the adjustment screw, said adjustment screw being driven in rotation by a motor, the sleeve of the steering column being noteworthy in that at least one of the bearings supporting the adjustment screw is a guide bearing with axial force take-up for immobilizing the adjustment screw against movement in translation, the motor being offset from said guide bearings.

By the term "offset" is meant that the motor is shifted away from or remote from the two guide bearings and therefore from the path of the at least axial forces that are transmitted from the adjustment screw to the first of the two elements in an accident situation. In this way the motor is not carried directly by one of the two guide bearings. Thanks to such a combination of features, the axial forces are taken up by at least one of the guide bearings, the motor being offset from said bearings immobilizing the adjustment screw against movement in translation, which eliminates the constraint of over-sizing the gear motor casing and enables said casing of the gear motor to be sized just right.

In accordance with one embodiment, the axial force take-up bearing immobilizes the adjustment screw against movement in translation in both directions along the adjustment axis, at least one other of the guide bearings preferably being a smooth bearing. In this way only one of the bearings has to be sized to take up the axial forces, which simplifies the design of the system.

In accordance with one embodiment, the motor includes a casing supported directly by the adjustment screw. In this way the motor is not carried directly by one of the two guide bearings.

In accordance with one embodiment, the motor includes a rotor that drives the adjustment screw directly or indirectly and a stator housed at least in part in the casing of the motor, said casing being pivotally connected with the adjustment screw about the adjustment axis. Gears can be situated at the outlet of a drive shaft forming the rotor of the motor, these gears driving the adjustment screw. In this case the rotor drives the adjustment screw indirectly and the gears are also housed in the casing, the combination forming a gear motor. The drive shaft preferably turns about an axis situated in a plane perpendicular to the guide axis.

In accordance with one embodiment, the guide system includes a device for retaining the motor casing in angular position relative to the adjustment axis. The angular position retaining device is preferably disposed between the motor casing and the first of the two elements, namely between the motor casing and the element with which the adjustment screw is constrained to move in translation. This kind of motor retaining device enables the position of the motor to be balanced when a torque is applied by the motor to the adjustment screw. This kind of retaining device takes up only a torque on the casing coupled to the gear motor. The path of the forces that participate in this retention passes through the motor casing and does not impact the sizing of the motor itself. Moreover, the torque applied by the motor casing to the retaining device is relatively low and necessitates no particular reinforcement, which renders the solution all the more simple to implement and light in weight.

In accordance with one embodiment, the device for retaining the motor in position includes a damper element disposed between the motor casing and the first of the two elements.

In accordance with one embodiment, the device for retaining the motor in position includes a nipple carried by a first of the two members consisting of the motor casing and a flange fastened to the first of the two elements, the nipple being configured to be housed in a recess of a second of the two members. This kind of cooperation of shapes suffices to retain the motor in a predetermined angular position, preventing it from rotating.

In accordance with one embodiment, the nipple is oriented along a retaining axis parallel to a driving axis of the rotor of the motor, preferably colinear with that axis. This kind of feature offers a good compromise between the retention of the motor and the overall size of the retaining device.

In accordance with one embodiment, the damper element is disposed between the nipple and the corresponding recess. In this way, the vibrations generated by the motor and transmitted to the structure are damped, which makes it possible to reduce the noise perceived by the driver.

In accordance with one embodiment, the motor casing is configured to pivot about the adjustment axis of the adjustment screw. In this kind of embodiment the motor is said to be floating, that is to say is connected to and carried only by the adjustment screw. The reaction of the motor to the torque applied to the adjustment screw is then not balanced by a retaining means connecting the gear motor to the column body, in particular the body of the sleeve, but this could be desirable in order to take up the motor torque in an adjustment system that could benefit from this torque to drive another mechanical device in parallel.

In accordance with one embodiment, a threaded portion of the adjustment screw is situated axially between the two guide bearings, the pivot connection preferably being situated on a portion extending beyond the axial force take-up guide bearing, on the side opposite the other guide bearing. Of course the configuration can vary, for example by placing the gear motor between the two guide bearings. However, the configuration in which the two bearings are situated on respective opposite sides of the threaded portion and the support bearing is situated on the portion extending beyond one of the two guide bearings has an important benefit, limiting the risk of buckling of the adjustment screw. In fact, in the case of vehicles equipped with a self-driving system, the manufacturers may be reduced to increasing the adjustment travels so as to be able to free up more space for the driver of the vehicle in driving phases in which the vehicle is controlled automatically. These new adjustment travels can typically be two to five times greater than in the case of a conventional vehicle. A direct consequence of this lengthening is lengthening of the axial length of the adjustment screw, and the risk of buckling is greater, whence the benefit of the configuration described hereinabove that places the two guide bearings directly on respective opposite sides of the threaded portion and not at its two axial ends, which is particularly suitable for this type of self-driving vehicle.

In accordance with one embodiment, the axial force take-up guide bearing includes a rolling bearing. The use of a rolling bearing is aimed on the one hand at reducing the friction between the adjustment screw and the structure of the column, in particular of the sleeve, and on the other hand at enabling simple design of the bearing to enable the take up of axial forces.

In accordance with one embodiment, the rolling bearing includes an inner race and an outer race between which are disposed rolling bodies, the inner race being fastened to the adjustment screw and the outer race being fastened to the first of the two elements, the inner and outer races being adapted to turn relative to one another about an axis of revolution coaxial with the adjustment axis.

In accordance with one embodiment, the rolling bodies comprise balls and/or needles and/or conical rollers. Conical rollers have the advantage of allowing an oblique contact rolling configuration in the situation where it would be desirable to take up higher axial forces.

BRIEF DESCRIPTION OF THE DRAWINGS

Other features and advantages of the disclosure will emerge upon reading the following description with reference to the appended figures, which illustrate.

For greater clarity identical or similar elements are identified by identical reference signs in all the figures.

DETAILED DESCRIPTION

Figure 1:
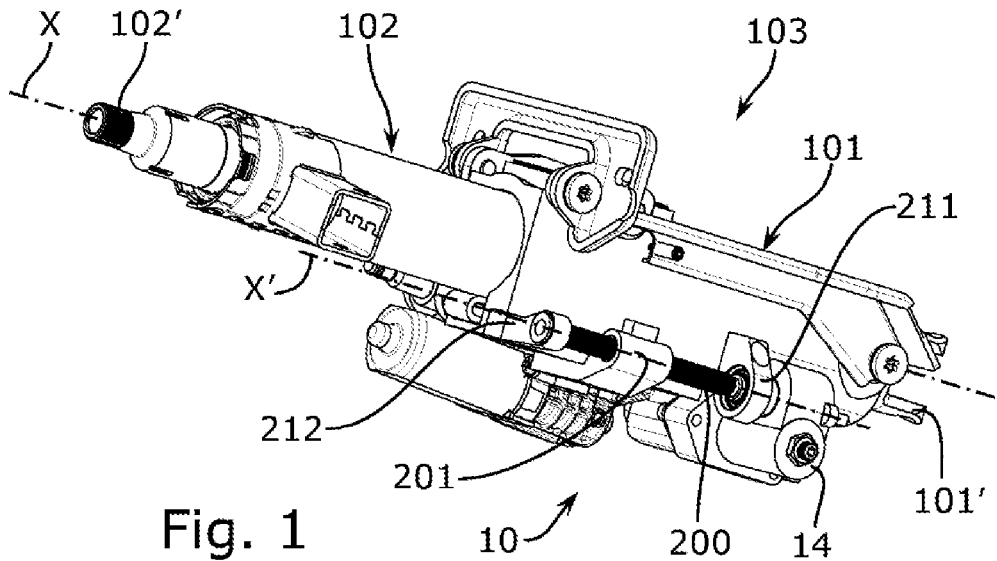
FIG. 1: a perspective view of a part of a steering column in accordance with one embodiment.
Figure 2:
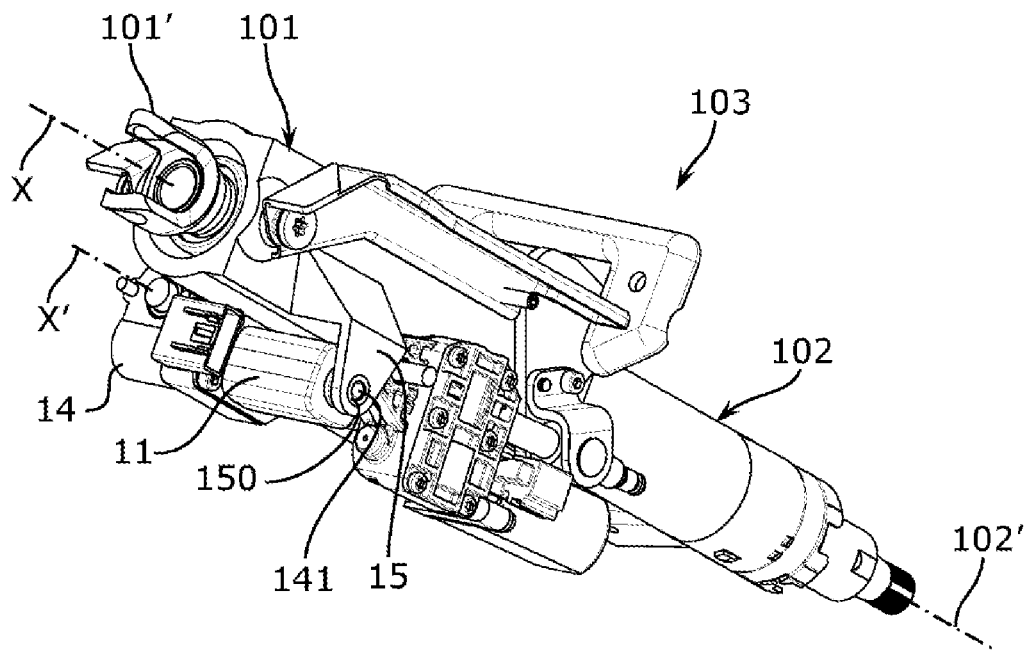
FIG. 2: another perspective view of a part of a steering column in accordance with that embodiment.

FIGS. 1 and 2 illustrate perspective views of a part of a steering column 103 of an automobile vehicle such as a car, provided with a sleeve 103. The sleeve 103 of the steering column is of the type including a telescopic system with two tubes 101, 102, an outer tube 101 and an inner tube 102 configured to move in translation inside the outer tube 101 along a reference axis X. The steering column includes a shaft, such as a steering shaft, guided in the sleeve 103. The inner tube 102 and the outer tube 101 of the sleeve 103 through which the steering shaft passes axially have a distal end 102' projecting relative to the inner tube 102 and configured to be connected directly or indirectly to a steering wheel (not illustrated). Another end 101' of the steering shaft, projecting relative to the outer tube 101, for its part features an interface such as a universal joint serving as an angle transmission for rotating a pinion meshing with a steering rack (not illustrated). The depth-wise adjustment of the steering wheel for a user is allowed in particular by the movement in translation of the inner tube 102 relative to the outer tube 101 of the sleeve 103.

To drive and to guide this relative movement in translation of the tubes 101, 102 relative to one another, an adjustment system 10 is provided with a screw 200 for adjustment of the relative axial position of the tubes 101, 102 extending along an adjustment axis X' parallel to the reference axis X and mounted on two bearings 211, 212 connected to the outer tube 101 fixed during the axial adjustment. In this way the adjustment screw 200 is constrained to move in translation with the outer tube 101 by means of the two guide bearings 211, 212, which are configured to guide the adjustment screw 200 in rotation about the adjustment axis X'.

The adjustment screw 200 meshes with a nut 201 fastened to the inner tube 102 so that rotation of the screw 200 about its adjustment axis X' drives a movement of the nut 201 in translation relative to the adjustment screw 200 and parallel to the reference axis X and therefore an axial movement of the inner tube 102 relative to the outer tube 101.

In order to drive the adjustment screw 200 in rotation, the system 10 for adjustment of the relative position between the two elements 101, 102 includes a motor 11. The motor 11 includes a drive shaft 13 forming a rotor that drives the adjustment screw 200 directly or indirectly. In this embodiment in particular, the drive shaft 13 is provided with a lead screw type reducer 131 meshing with a toothed wheel 202 carried by a body of the adjustment screw 200. The assembly formed by the motor 11 and the reducer or reducers, also termed a gear motor, is housed at least in part in a casing 14 of the motor 11. The stator of the motor 11 is fixedly fastened to this casing 14, forming a kinematically-coupled assembly. Here the term "casing" is to be understood in the broad sense of a mechanical envelope surrounding all or part of an assembly. Here the stator of the motor 11 is enveloped in a first casing 14a that is itself housed in part in and/or fixed in a complementary manner to a second casing 14b (see FIG. 5). To be more precise, this means a gear motor casing 14.

In accordance with the disclosure, at least one of the bearings 211, 212 supporting the adjustment screw 200 is a guide bearing with axial force take-up for immobilizing the adjustment screw 200 against movement in translation. In particular, at least one of the bearings 211, 212 supporting the adjustment screw 200 is a guide bearing with axial force take-up, fixed, preferably directly, to the first of the two elements, namely the outer tube 101, to transmit directly axial forces from the adjustment screw 200 to the first of the two elements in at least one axial direction and without passing through the motor 11. In this embodiment the bearing 211 with axial force take-up is that of the two bearings 211, 212 that is at the greatest distance from the inner tube 102 or again at the greatest distance from the end 102' configured to be connected to the steering wheel. In other words, it is whichever of the two bearings 211, 212 supporting the adjustment screw 200 that is closest to the end 101' on the universal joint side. Of course, the configuration may be reversed if required.

The bearing 211 adapted to take up axial force is here configured to immobilize the adjustment screw 200 against movement in translation in both directions along the adjustment axis X'. The other bearing 212 of the two bearings is a smooth bearing, that is to say guides rotation of the adjustment screw 200 by sliding.

To provide the guidance in rotation of the adjustment screw 200, the bearing 211 with axial force take-up is a rolling bearing. Accordingly, the rolling bearing 211 comprises an inner race 213 fastened to the adjustment screw 200, for example by shrink fitting it, and an outer race 214 fastened to the outer tube 101, between which are disposed rolling bodies 215. The inner and outer races 213, 214 are able to turn relative to one another about an axis of revolution coaxial with the adjustment axis X'. Here the rolling bodies 215 are balls. In the situation where the axial loads that must be taken up by the rolling bearing 211 are higher, rolling bodies 215 such as conical rollers or needles could replace the balls. Alternatively, using a smooth bearing could be envisaged. A combination of different bearings, thrust bearings and/or rolling bearings, could also be used. For example there may be envisaged using a needle thrust bearing that takes up the axial forces combined with a needle type rolling bearing or a smooth bearing.

To guarantee that axial forces are taken up each of the inner race 213 and the outer race 214 is immobilized axially by abutments on respective opposite sides of the raceways of the rolling bearing. The raceways are preferably configured to envelope the rolling bodies locally enough to take up the axial forces.

Figure 4:
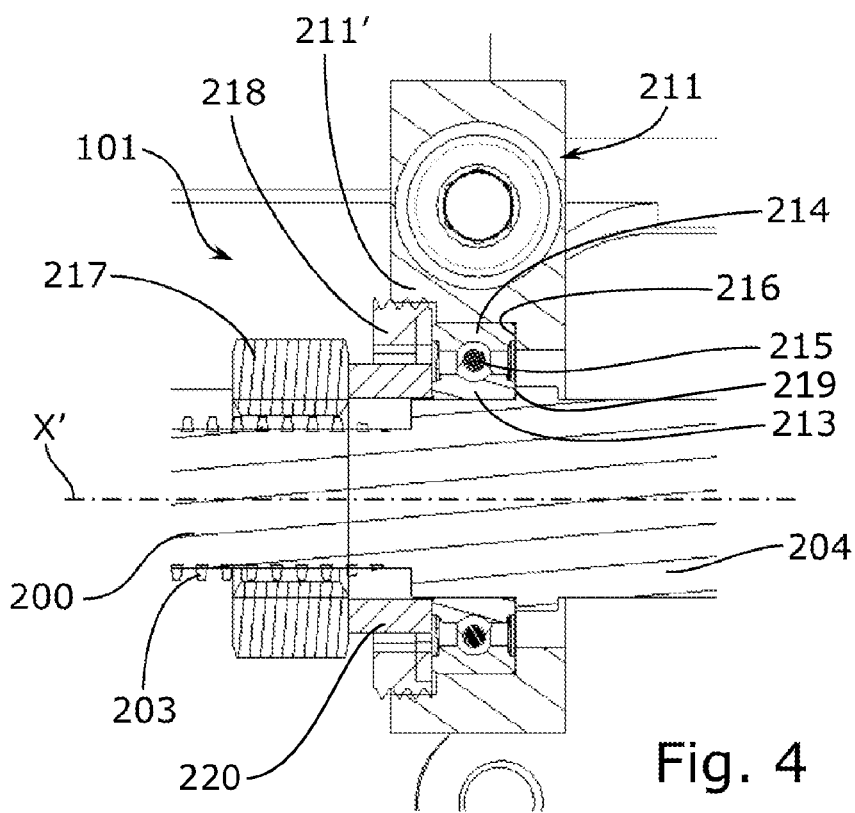
FIG. 4: a detail of FIG. 3.

In particular, as can be seen in particular in FIG. 4, the inner race 213 is configured to come into abutment in axial direction against a shoulder 219 on the body of the adjustment screw 200 and to come indirectly into abutment in the opposite axial direction against a first nut 217 screwed onto the body of the adjustment screw 200, a spacer 220 in the form of an intermediate race being disposed between said first nut 217 and the inner race 213. In the same manner, the outer race 214 is configured to come into abutment in one axial direction against a shoulder 216 on a base 211' of the bearing fastened to the outer tube 101 and to come into abutment in the opposite axial direction against a second nut 218 screwed into a bore in the fixed base 211' of the bearing 211. The inner race 213 and the outer race 214 are then immobilized axially in both directions of the adjustment axis X. Sealing flanges close off axially the space delimited between the inner race 213 and the outer race 214 inside which the rolling bodies 215 are housed.

In accordance with one feature of the disclosure, the motor 11 is offset from the two bearings 211, 212 supporting the adjustment screw 200. In particular, as is the case here, the gear motor is offset from the two bearings 211, 212. In this way, the motor 11 is offset from the path of the axial forces transmitted by the adjustment screw 200 to the outer tube 101 in the event an axial load is applied to the sleeve 103 of the steering column.

To this end, the bearings 211, 212 are placed axially on respective opposite sides of a threaded portion 203 of the adjustment screw 200. The adjustment screw 200 includes a body that passes axially through the guide bearing 211 and a portion 204 of which extends axially beyond the guide bearing 211 with axial force take-up, on the side opposite the other guide bearing 212.

Figure 5:
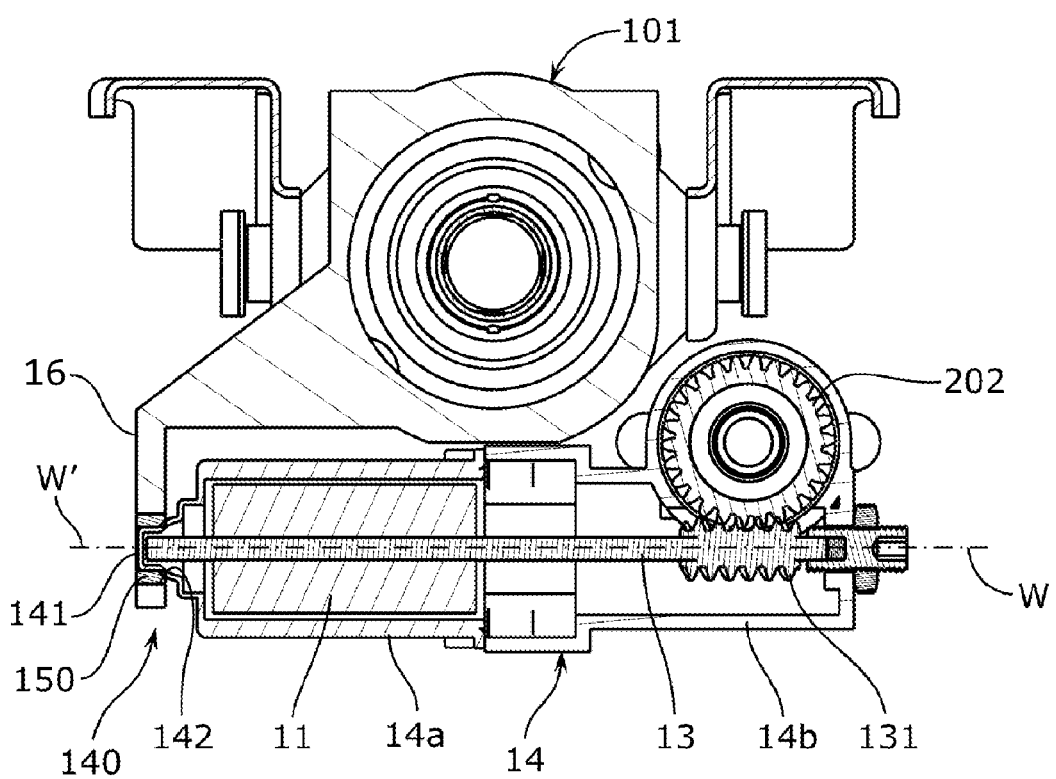
FIG. 5: a view in cross-section of FIG. 1.

The motor 11 includes a drive shaft 13 guided in rotation relative to the casing 14 by means of bearings (generally two or three bearings, FIG. 5 illustrating three bearings comprising a bearing at each end of the shaft 13 and an intermediate bearing). The motor 11 is mounted on the adjustment screw 200 that supports it by means of its casing 14, in particular the part 14b of the casing 14. The casing 14 of the motor 11, to be more precise of the gear motor, is pivotally connected at 15 to the adjustment screw 200 to position the motor 11 axially relative to the adjustment screw 200. To be more precise, the casing 14 has two interfaces on respective opposite axial sides of the toothed wheel 202 relative to the adjustment axis X', which interfaces each form a mounting bearing 15' together forming the motor bearing with the adjustment screw 200. These mounting bearings 15' may be integrated directly into the casing of the reducer, which may be made of plastic material(s), as they take up only the forces generated by the gear system of the gear motor. It may be noted that as an alternative there may be envisaged only one motor bearing 15', also a mounting bearing.

These mounting bearings 15' enable the adjustment screw to support the motor so that said motor is not supported by the structure of the sleeve of the steering column, namely in particular the outer tube 101. In particular, here the gear motor is placed on the adjustment screw, cantilevered from it given that the motor is supported on a portion 204 in line with the adjustment screw 200 and offset from the intermediate portion 203 situated between the guide bearings 211, 212 that receive the nut 201.

As is illustrated in FIG. 5 in particular, the motor 11 is housed in part in the casing 14b, at the level of a first end from which projects the drive shaft forming the rotor. At the level of a second end, opposite the first end, the casing 14a includes a device 140 for retaining the motor 11 angularly in position relative to the adjustment axis X', in particular of the motor casing relative to the adjustment axis X'. The casing parts 14a, 14b constituting the casing 14 are fastened together to define an interior space in which the gear motor is housed, the casing 14a enveloping the stator of the motor 11 and itself coming to be housed in part in the casing 14b pivotally connected to the adjustment screw 200 and enveloping the gear motor(s).

This kind of angular position maintaining device 140 simply aims to maintain the motor 11 in a predetermined angular position relative to the axis X of the adjustment screw, the pivot connection between the motor and the adjustment screw 200 being able to drive pivoting about this axis. As is illustrated in detail in FIG. 5, the retaining device 140 is positioned between the motor casing 14 and a flange 16 fastened to the outer tube 101.

The retaining device 140 includes a nipple 141 carried by the casing 14 of the motor 11 and projecting relative to said casing 14, the nipple 141 being configured to come to cooperate in a recess 142 of the flange 16; the nipple 141 is oriented along a maintaining axis W' parallel to and even aligned with a driving axis W of the rotor 13 of the motor 11. The driving axis W of the rotor 13 of the motor 11 is disposed so as to be orthogonal to the adjustment axis X' of the adjustment screw 200. Of course, other orientations may be envisaged. For example, there may be a certain different angle between the driving axis W of the rotor 13 of the motor 11 and the adjustment axis X' of the adjustment screw 200 as a function of the surroundings of the system, in particular to address overall size constraints.

The adjustment system includes a damper element 150 disposed between the nipple 141 and the corresponding recess 142 and more generally carried by the retaining device. This damper element, preferably made of a damping material, takes up the torque from the gear motor 11 and positions the latter angularly relative to the axis X of the adjustment screw 200 thanks to the cooperation of shapes between the nipple 141 and the recess 142. This element may ideally be made of natural or synthetic rubber or even of a thermoplastic material.

Thanks to a solution of this kind, the screw/gear motor/structure connections are configured to transmit the axial forces exerted on the steering wheel directly from the adjustment screw 200 to the structure without passing through the gear motor 11.

Accordingly, thanks to this embodiment, when a user actuates the axial adjustment of the steering wheel, the gear motor generates a torque necessary for rotating the adjustment screw 200 on which the nut 201 is located. This nut transforms the movement in rotation of the adjustment screw 200 into an axial movement that corresponds to the movement of adjustment of the steering wheel. The reaction of the gear motor 11 to the torque applied to the adjustment screw 200 is balanced by means of the retaining device 140 connecting the gear motor to the body of the sleeve, namely the outer tube 101, complemented by the damper element 150 to limit the noise that could be generated by vibrations.

When an axial force is applied to the steering wheel, in particular in a crash situation, that force is transmitted to the adjustment screw 200 via the structure at the top of the sleeve (inner tube 102) and the adjustment nut 201 that is fastened to it. The rolling bearing 213, 214, 215 of the bearing 211 takes up this force and transmits it directly to the outer tube 101. In a configuration of this kind, no force is applied to the gear motor itself and it is not necessary to select an oversized motor casing.

Figure 3:
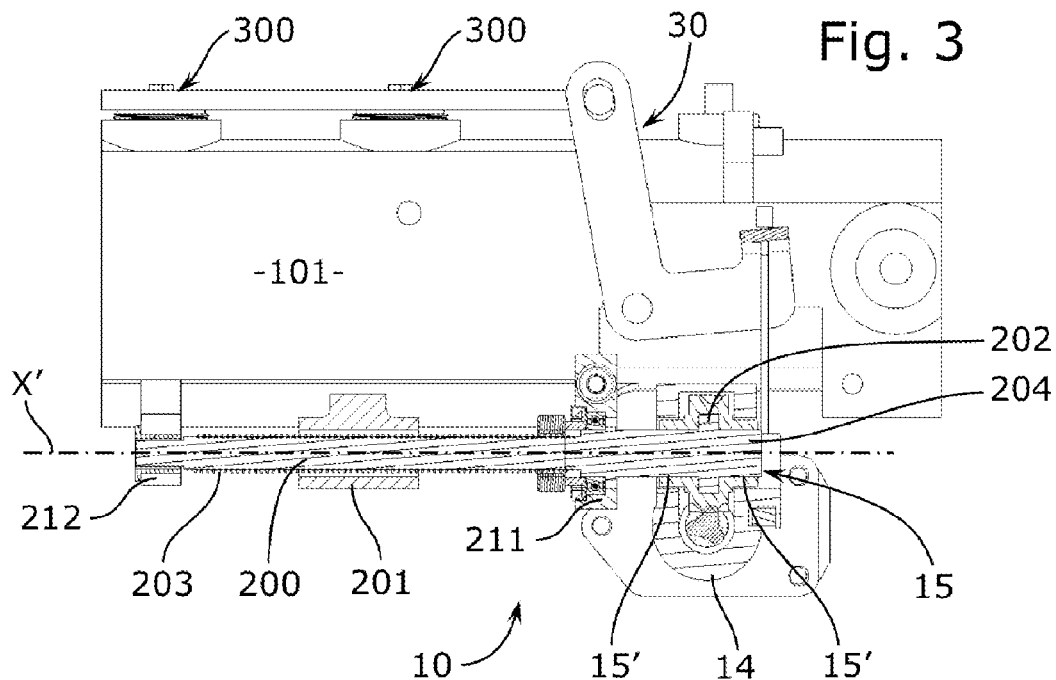
FIG. 3: a view in axial section of a part of a sleeve of a steering column in accordance with another embodiment.

In an embodiment that can be seen in part in FIG. 3, the motor casing 14 may be configured to pivot about the adjustment axis X' of the adjustment screw 200, here as a function of the torque applied by the motor to the adjustment screw 200. This kind of configuration may be of particular benefit when it is required that a dedicated kinematic chain 30 take up this torque. In this case, a kinematic chain 30 may be selected that is configured for example to drive another mechanical device such as a device for adjustment of a force 300 resisting movement of the two tubes 101, 102 relative to one another.

In fact, to mask an operating play and to guarantee a minimum stiffness of the connection of the two tubes 101, 102 to one another in the position of use, the sleeve 103 of the steering column is provided with at least one friction shoe (not illustrated) supported by the output tube 101 and configured to come into contact with and to bear against a clamping surface of the inner tube 102. In the position of use the system is configured so that a predetermined pressure of use of the friction shoe carried by the outer tube 101 is applied against the clamping surface of the inner tube 102. Such pressure of the friction shoe aims to increase a resisting force to oppose relative movement in translation between these two elements consisting of the outer tube 101 and the inner tube 102.

The axial position adjustment system 10 may then include devices 300 for adjustment of the resisting force enabling movement in translation of the associated friction shoe at least between the position of use and an adjustment position in which the pressure of the friction shoe against the clamping surface is reduced compared to the position of use. It is then possible to achieve higher speeds of adjustment between the two tubes 101, 102, thus further avoiding over-sizing of motors generating the relative movement of the two tubes 101, 102.

In such a case, the pivoting of the motor casing may be predetermined so as to pivot as a function of a threshold torque driving the adjustment screw 200 to drive one or more devices 300 for adjustment of the resisting force aiming to reduce the driving torque of the adjustment screw 200 and to enable faster depth-wise adjustment of the steering column.

Generally speaking, whether the connection between the motor or the gear motor and the structure of the steering column is "flexible", for example elastic by virtue of the damper element 150, or non-existent, for example if the motor casing 14 can be configured to pivot about the adjustment axis X' of the adjustment screw 200, when indeed there would exist abutments for limiting the pivoting of the motor casing 14, the motor or gear motor is not rigidly connected to the structure of the steering column and in particular to the first 101 of the two elements 101, 102 to which the bearings 211, 212 are fastened, and thus makes it possible not to transmit vibrations generated by the motor to the structure. Moreover, the motor or gear motor being offset from the two bearings 211, 212, it enables just right sizing of said casing of the gear motor.

The disclosure is naturally described hereinabove by way of example. It is to be understood that the person skilled in the art is able to produce different variants of the disclosure without this departing from the scope of the disclosure.

For example, the retaining device may be produced in a different manner. For example, the cooperation between the nipple 141 and the recess 142 may be reversed relative to the elements to which they are fastened. Moreover, they may be formed differently. There may be conceived a finger clamped by a member different from a recess or cooperating in an axial groove carried by the outer tube so that, if an axial force tends to create axial movement of the motor relative to the outer tube, said motor effects a relatively small travel, but is guided by the groove without being subjected to any force. Moreover, the retaining device may be formed by the damper element itself. For example, a rubber material belt may serve to retain the gear motor.

The invention claimed is:

1. A sleeve of a steering column, comprising:
   two elements including an outer tube and an inner tube mobile in translation relative to one another along a reference axis, and
   an adjustment system comprising an adjustment screw for adjustment of an axial position extending along an adjustment axis parallel to the reference axis and constrained to move in translation with a first of the two elements by at least two guide bearings to guide the adjustment screw in rotation about the adjustment axis,
   wherein the adjustment screw is inter-engaged with a nut fastened to a second of the two elements so that rotation of the screw about the adjustment axis drives movement of the nut in translation relative to the adjustment screw,
   wherein the adjustment screw is driven in rotation by a motor,
   wherein at least one of the at least two guide bearings is a first guide bearing with axial force take-up for immobilizing the adjustment screw against movement in translation, and
   wherein the motor is offset from said at least two guide bearings and includes a casing supported directly by the adjustment screw.

2. The sleeve as claimed in claim 1, wherein the axial force take-up immobilizes the adjustment screw against movement in translation in both directions along the adjustment axis.

3. The sleeve as claimed in claim 2, wherein at least one second guide bearing of the at least two guide bearings is a smooth bearing.

4. The sleeve as claimed in claim 1, wherein the motor includes a rotor configured to drive the adjustment screw directly or indirectly and a stator housed at least in part in the casing of the motor, said casing being pivotally connected with the adjustment screw about the adjustment axis.

5. The sleeve as claimed in claim 4, further comprising a device for retaining the casing of the motor in angular position relative to the adjustment axis.

6. The sleeve as claimed in claim 5, wherein the device for retaining the motor in position includes a damper element disposed between the motor casing and the first of the two elements.

7. The sleeve as claimed in claim 5, wherein the device for retaining the motor in position includes a nipple carried by the motor casing, the nipple being configured to be housed in a recess of a flange fastened to the first of the two elements.

8. The sleeve as claimed in claim 7, wherein the nipple is oriented along a retaining axis parallel to a driving axis of the rotor of the motor.

9. The sleeve as claimed in claim 7, wherein:
   the device for retaining the motor in position includes a damper element disposed between the motor casing and the first of the two elements, and
   the damper element is disposed between the nipple and the recess.

10. The sleeve as claimed in claim 5, wherein the angular position retaining device is disposed between the motor casing and the first of the two elements.

11. The sleeve according to claim 4, wherein a threaded portion of the adjustment screw is situated axially between the at least two guide bearings.

12. The sleeve according to claim 11, wherein the pivot connection is situated on a portion extending beyond the axial force take-up guide bearing, on a side opposite a second guide bearing of the at least two guide bearings.

13. The sleeve as claimed in claim 1, wherein the casing of the motor is configured to pivot about the adjustment axis of the adjustment screw.

14. The sleeve as claimed in claim 1, wherein the first guide bearing includes a rolling bearing.

15. The sleeve as claimed in claim 14, wherein:
   the rolling bearing includes an inner race and an outer race between which are disposed rolling bodies,
   the inner race is fastened to the adjustment screw and the outer race is fastened to the first of the two elements, and
   the inner race and the outer race are adapted to turn relative to one another about an axis of revolution coaxial with the adjustment axis.

16. The sleeve as claimed in claim 15, wherein the rolling bodies comprise balls or conical rollers.

* * * * *